May 20, 1930.

W. O. PROUTY

DISPLAY SIGN

Re. 17,672

Original Filed June 7, 1927

INVENTOR.

Willis O. Prouty

BY

Walter A. Scott

ATTORNEY.

Reissued May 20, 1930 Re. 17,672

UNITED STATES PATENT OFFICE

WILLIS O. PROUTY, OF HERMOSA BEACH, CALIFORNIA

DISPLAY SIGN

Original No. 1,671,741, dated May 29, 1928, Serial No. 197,103, filed June 7, 1927. Application for reissue filed March 19, 1930. Serial No. 437,255.

My invention relates to illuminated display signs of the type in which the illuminating means is a tubular lighting element and conforms to the shape of the design or characters, the latter generally being in relief or of contrasting color or both. In such signs the form of the design or characters is shown by the direct light from the tubular lighting element and also by the light incident upon and reflected from the relief or colored design of characters in front of which the tubular lighting element is mounted. It is highly desirable that signs of this character be as pleasing in appearance and as attractive by daylight as in darkness. At night the direct light from the lamps and the reflected light from the underlying design contrast so intensely with the surrounding darkness as to obscure and render invisible the structural details of the sign, with the result that the appearance of the brilliantly illuminated design is not impaired by any of the structural details. In daylight, however, all of the structure of the sign is visible even with the lamps glowing, and for this reason signs of this type are not as attractive by daylight as ordinary unilluminated signs.

One of the objects of my invention is to make a sign of this type that will be as attractive by daylight as a sign especially designed for daylight illumination or other illumination from a source external to the sign itself, that is, to make a sign that will be equally attractive when self-illuminated and when illuminated by daylight or other light falling on it from a source outside of the sign. A further object of my invention is to provide maximum reflection of light from the raised or colored design behind the tubular lamp, to make the raised or colored design of a material to which dust and foreign matter will not readily adhere and which will be water and weather-proof and in itself provide the necessary insulation for the tubular lamps. Tubular neon lamps are largely used for the purpose above mentioned. My invention is adapted for use with such neon lamps as well as with other means of illumination such as tubular filament lamps or Geissler tubes, or any source of illumination that may be arranged in a lineal form.

In the drawings

Figure 1:
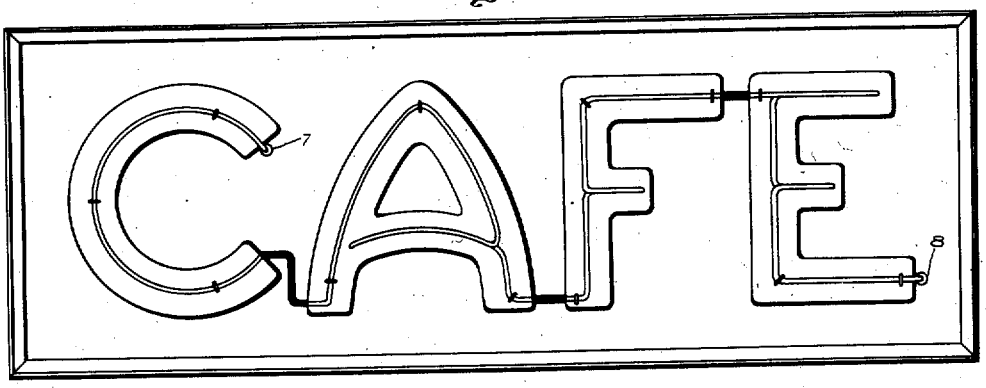
Figure 1 is an elevation view of a sign constructed according to my invention, the illuminating element being a tubular neon lamp.
Figure 2:
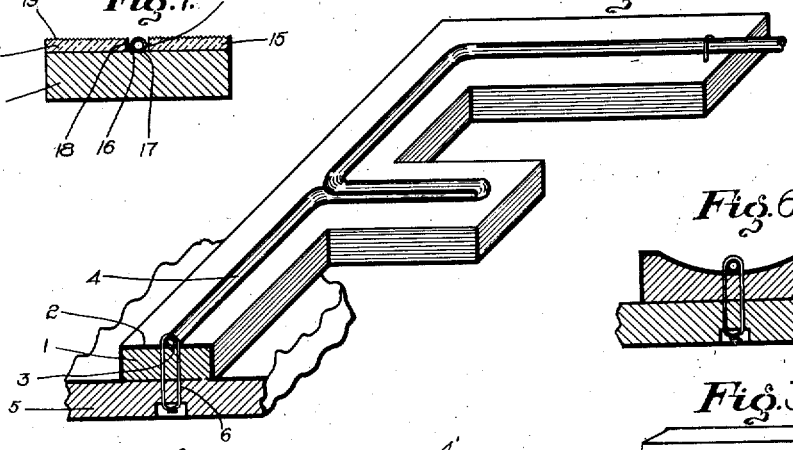
Figure 2 is a perspective view partly in action of one of the letters forming part of the sign shown in Figure 1.

Referring first to Figure 1 of the drawings, each of the letters is formed of glazed ceramic material, one of the letters being separately shown in Figure 2 where the ceramic body of the latter is shown at 1 and the glaze at 2. A groove 3 conforming in outline to the shape of the letter and following the central line of the exposed surface of the letter serves as a seat for the neon tube 4. The tube 4 is preferably fastened to the letter and to the underlying base 5, which may also be of ceramic material, by means of a wire holder 6 which extends over the tube 4 and through perforations in the letter and base. The letter may be secured to the base by cement or other suitable means or may be integrally formed therewith. At 7 and 8 I have indicated sleeves through which the terminals of the tubular illuminating element extend to the back of the sign.

Figure 3:
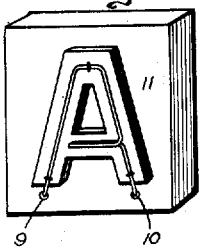
Figure 3 is a perspective of a sign unit consisting of a base having an illuminated character thereon designed for assemblage with other characters to form a complete sign.

The structure shown in Figure 3 is similar to that shown in Figures 1 and 2 except that the single character there shown, the letter "A", is constructed as a separate unit, the section of the tubular illuminating element for that letter being complete with its terminals 9, 10 extending to the back of the section 11 of the base which is made integral with or permanently fixed to the part forming the letter "A".

Figure 4:
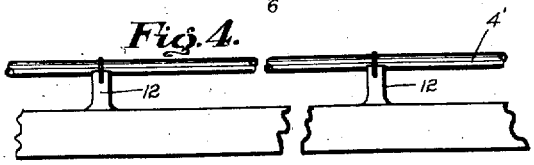
Figure 4 is a fragmentary view of part of one of the characters showing a modification of the means for supporting the lamp.
Figure 5:
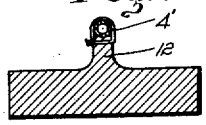
Figure 5 is a section on the line 5—5 of Figure 4.

The structure shown in Figures 4 and 5 differs from that shown in Figures 1 to 3 in having the tubular lighting element 4′ mounted on brackets 12 which are preferably formed as integral parts of the letter or other character on which the lighting element is fixed. The brackets 12 project outwardly from the body of the character to space the tubular lighting element at a sufficient distance from the exposed surface of the character to permit the light to fall directly upon and to be reflected therefrom. With the lighting element mounted as in Figures 1 to 3 dependence is placed largely upon diffusion of the light edgewise through the glaze as well as by incidence upon the surface of the glaze to illuminate the exposed surface of the letter.

Figure 6:
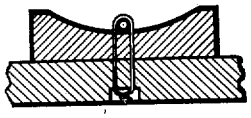
Figure 6 is a cross-section of another modified form of letter of other character or design element.

In Figure 6 I have shown the upper surface of the letter concave with the tubular lighting element extending along the deepest part of the concavity, thereby premitting the rays of light from the tube to fall directly upon the exposed concave surface of the letter.

Figure 7:
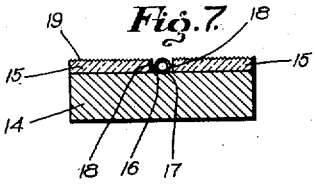
Figure 7 is a cross-section of another modification of the character or design element.

In the form of the invention shown in Figure 7, which is a cross-section of one of the letters or characters, I have provided different means for spreading the light over the entire exposed surface of the character to be illuminated. In this form 14 represents the ceramic body, preferably glazed, of the letter. 15, 15 are plates of glass which cover the entire exposed face of the letter except the central space 16 which forms a recess conforming to the shape of the letter and in which the tubular lighting element 17 lies. The light from about the outer half of the circumference of the tube will radiate directly from the tube to the eye of the observer while the remainder of the light will enter the interior of the glass plates 15, 15 through the edges 18, 18 and will be confined therein by total reflection, except when incident upon the outer surfaces 19 of the glass plates, which surfaces may be made irregular by etching of the plates, or if desired the necessary irregular surface for the reflection of the rays to the outside may be provided upon the inner surface of the glass plates or otherwise disposed as in devices involving the same principle as heretofore constructed.

Figure 8:
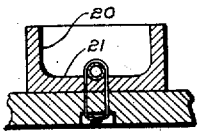
Figure 8 is a cross-section of another form of character or design element.

In Figure 8 I show the cross-section of a character having the lighing element mounted in a relatively deep channel having outwardly projecting side walls 20. In this form the larger part of the light falls upon and is reflected from the base 21 and side walls 20 of the ceramic character thus increasing the brilliancy of the ceramic character relative to that of the direct light from the tube.

Signs constructed according to my invention possess many advantages growing out of the properties of the ceramic material which is preferably used in their construction. Glass also possesses these properties in a high degree but does not lend itself so readily to the processes of manufacture and to the construction of individual signs of special design. While in its broader aspect my invention includes the use of glass and similar materials which are vitreous throughout or which may be prepared with a vitreous surface or outer layer I have found ceramic material to be best suited to the purpose as it is an exceptionally good insulator, is easily molded or pressed to the form desired, can be glazed and given any desired color, and by reason of its glazed surface presents a more brilliant appearance by reflected light than substances heretofore used, is water- and weather-proof and presents a surface to which dust, soot, and foreign matter generally, does not readily adhere and from which such substances may be readily removed. Furthermore, as herein described, ceramic material can be constructed in simple forms for the support of the illuminating element and this, together with its glazed surface renders it possible to construct signs that present as pleasing an appearance by daylight as when illuminated at night.

I claim:

1. A display sign comprising a character in relief formed of glazed ceramic material, said character having brackets integrally formed therewith and projecting from the exposed face thereof, and a tubular lighting element conforming to the shape of said character and mounted on said brackets, said lighting element lying substantially parallel to the exposed face of said character and at a distance therefrom to permit direct radiation of light from said element to all parts of the exposed face of said character.

2. A display sign comprising a ceramic character having a glazed exposed face, a luminous tube conforming to the shape of said character, said tube lying substantially parallel to the exposed face of said character and spaced therefrom and means for supporting said tube in the spaced relation over the character.

3. In combination, means presenting a glazed ceramic surface and forming a symbol, a luminous tube in spaced relation to said surface, said tube forming a continuous column of illumination when energized, the axis of the column being parallel to the surface, and substantially conforming in shape to the symbol, and means for supporting said tube in spaced relation to the surface.

In testimony whereof I have hereunto set my hand.

WILLIS O. PROUTY.